(12) United States Patent
Watanabe

(10) Patent No.: US 9,544,448 B2
(45) Date of Patent: Jan. 10, 2017

(54) COMMUNICATION APPARATUS AND METHOD FOR DETERMINING CONNECTION

(71) Applicant: Kenichi Watanabe, Kanagawa (JP)

(72) Inventor: Kenichi Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/068,790

(22) Filed: Mar. 14, 2016

(65) Prior Publication Data

US 2016/0277598 A1  Sep. 22, 2016

(30) Foreign Application Priority Data

Mar. 20, 2015  (JP) .................................. 2015-058516
Feb. 25, 2016  (JP) .................................. 2016-034560

(51) Int. Cl.
*H04N 1/00* (2006.01)
*H04N 1/32* (2006.01)

(52) U.S. Cl.
CPC ........ *H04N 1/00037* (2013.01); *H04N 1/0001* (2013.01); *H04N 1/001* (2013.01); *H04N 1/00206* (2013.01); *H04N 1/32641* (2013.01); *H04N 2201/0094* (2013.01)

(58) Field of Classification Search
CPC ............ G03G 15/5004; G03G 15/2039; G03G 15/2064; G03G 15/80; B41J 11/0015; B41J 29/02; B41J 29/393; B41J 2/16517; B41J 2/1652; B41J 2/17; B41J 2/505; G06K 15/102; H04N 1/2307; H04N 1/2346
USPC ........... 399/88, 37, 320, 70, 97; 400/120.01, 400/120.14, 124.01; 347/61, 10, 14, 57, 9; 358/1.13, 1.2, 1.4; 455/127.2, 571, 69
See application file for complete search history.

(56) References Cited

U.S. PATENT DOCUMENTS

| | | | | |
|---|---|---|---|---|
| 5,545,930 A * | 8/1996 | Watanabe | .................. | H02P 9/02 307/10.1 |
| 9,292,075 B2 * | 3/2016 | Takizawa | ............... | G06F 1/3234 |
| 2006/0269312 A1 * | 11/2006 | Muraishi | ............ | G03G 15/5004 399/88 |
| 2007/0071479 A1 * | 3/2007 | Semma | .............. | G03G 15/5004 399/88 |
| 2010/0052636 A1 * | 3/2010 | Takagi | ..................... | G05F 1/573 323/281 |
| 2012/0280673 A1 * | 11/2012 | Watanabe | ............. | H02J 3/1885 323/304 |
| 2013/0134779 A1 * | 5/2013 | Watanabe | ................. | G05F 1/70 307/24 |
| 2013/0148799 A1 * | 6/2013 | Hamamichi | .......... | H04M 1/738 379/142.17 |

(Continued)

FOREIGN PATENT DOCUMENTS

JP  2013-225840  10/2013

*Primary Examiner* — Negussie Worku

(74) *Attorney, Agent, or Firm* — Oblon, McClelland, Maier & Neustadt, L.L.P.

(57) ABSTRACT

A communication apparatus includes: a controller that controls processing to perform facsimile; a first controlling unit that controls a voltage between lines that perform facsimile in accordance with control by the controller; a detector that detects a voltage change between the lines; and second controlling unit that discharges electric charge accumulated in between the lines so as to enable the detector to detect a voltage change between the lines when the first controlling unit is turned off. The controller determining whether connection to the lines is made based on the voltage change detected by detector.

10 Claims, 5 Drawing Sheets

(56) References Cited

U.S. PATENT DOCUMENTS

| | | | |
|---|---|---|---|
| 2013/0258424 A1* | 10/2013 | Ono | H04N 1/00323 358/475 |
| 2014/0104631 A1* | 4/2014 | Baba | H04N 1/00323 358/1.13 |
| 2014/0104636 A1* | 4/2014 | Baba | H04N 1/00323 358/1.14 |
| 2014/0127538 A1* | 5/2014 | Uruno | H01M 2/12 429/53 |
| 2015/0002876 A1* | 1/2015 | Ghimire | H04M 11/066 358/1.13 |
| 2015/0123626 A1* | 5/2015 | Watanabe | H02J 3/46 323/205 |
| 2016/0036596 A1* | 2/2016 | Fukushima | H04L 12/12 370/241 |

* cited by examiner

COMMUNICATION APPARATUS AND METHOD FOR DETERMINING CONNECTION

CROSS-REFERENCE TO RELATED APPLICATIONS

The present application claims priority to and incorporates by reference the entire contents of Japanese Patent Application No. 2015-058516 filed in Japan on Mar. 20, 2015 and Japanese Patent Application No. 2016-034560 filed in Japan on Feb. 25, 2016.

BACKGROUND OF THE INVENTION

1. Field of the Invention

The present invention relates to a communication apparatus and a method for determining connection.

2. Description of the Related Art

ErP Directive Lot 6 as an energy-saving standard in Europe has been revised. When a network line including a facsimile (FAX) and a device become a non-communication state, no job comes from a network or a FAX line, and a multifunction peripheral (MFP) or the like having communication functionality is not used until a user directly operates and uses the device such as copying or scanning next time. For this reason, the standard has been revised so as to make the device an off-mode state when the network line including a FAX is in a non-communication state.

In a FAX public line, a voltage is applied across lines by station power supply from a telephone station, and whether the FAX public line and the device are connected to each other can be determined by causing a FAX line control device that controls the FAX line to detect a voltage value between the lines.

However, recently, as a result of seeking a further energy-saving effect, even the FAX line control device turns off electric power. A technique is known that provides a ringing detection circuit to detect an incoming call (a ringing signal) from the FAX line and polarity inversion during energy-saving, monitors a voltage between the lines, detects the incoming call and the polarity inversion, and also detects line disconnection by this circuit.

Japanese Patent Application Laid-open No. 2013-225840 discloses a communication terminal that is connected to a public line and includes facsimile functionality, the communication terminal including a mechanical relay that switches between a disconnected state in which an external telephone connected to the communication terminal is disconnected from the public line and a connected state in which the external telephone is connected to the public line, a polarity inversion detection circuit that detects whether the polarity of a signal from the public line has been inverted, and a line controller that is set with non-ringing receiving functionality that allows reception without ringing the external telephone in response to ringing from the public line and controls the mechanical relay so as to switch from the connected state to the disconnected state when inversion of the polarity of the signal from the public line is detected.

However, the conventional ringing detection circuit includes a capacitor mounted in between the lines to detect ringing. Electric charge is charged to this capacitor by the station power supply, and even when line disconnection occurs, the state in which the electric charge is charged to the capacitor continues for a while, and the voltage between the lines remains to be maintained. The electric charge of the capacitor then escapes through natural discharge. The ringing detection circuit includes a photo coupler and ringing and polarity inversion can be detected from a value of current flowing through the photo coupler. However, the ringing detection circuit has a problem in that, from a value of current flowing through the photo coupler caused by a voltage decrease caused by natural discharge, the voltage decrease cannot be detected due to the characteristics of the photo coupler, and consequently, line disconnection cannot be detected.

In view of the above, there is a need to provide a communication apparatus and a method for determining connection that can detect line disconnection when a line is in a non-communication state.

SUMMARY OF THE INVENTION

It is an object of the present invention to at least partially solve the problems in the conventional technology.

A communication apparatus includes: a controller that controls processing to perform facsimile; a first controlling unit that controls a voltage between lines that perform facsimile in accordance with control by the controller; a detector that detects a voltage change between the lines; and second controlling unit that discharges electric charge accumulated in between the lines so as to enable the detector to detect a voltage change between the lines when the first controlling unit is turned off. The controller determining whether connection to the lines is made based on the voltage change detected by the detector.

A method for determining connection includes: when a first controlling unit that controls a voltage between lines performing facsimile is turned off, discharging electric charge accumulated in between the lines so as to enable a detector to detect a voltage change between the lines; detecting a voltage change between the lines when the first controlling unit is turned off; and determining whether connection to the lines is made based on the detected voltage change.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
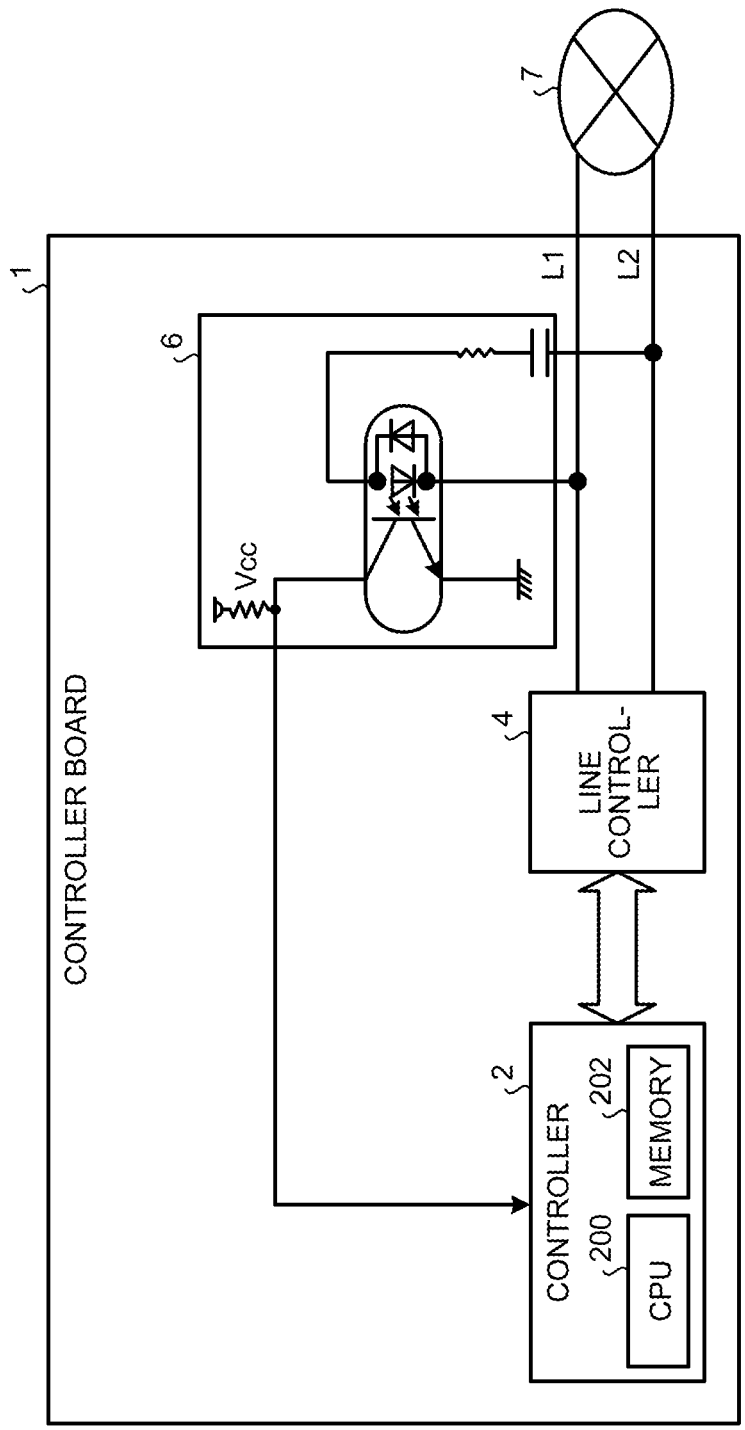
FIG. 1 is a diagram of an outline of a configuration of a controller board that implements FAX communication.

First, the following describes a background from which the present invention has been made. FIG. 1 is a diagram of an outline of a configuration of a controller board 1 that implements FAX communication. The controller board 1 is provided in an image forming apparatus such as an MFP, is connected to a public line 7, and performs FAX communication with other devices. The public line 7 is directly connected to a switchboard of an exchange, and a voltage of DC 48 V is superimposed thereon by the switchboard.

The controller board 1 includes a controller 2, a line controller (a FAX line control device: a first controlling unit) 4, and a ringing detection circuit 6. The controller 2 includes a CPU 200 and a memory 202, transmits and receives FAX data signals to and from the line controller 4, and controls processing to perform FAX. The line controller 4 performs control on the public line 7 (lines L1 and L2) that performs FAX in accordance with the control by the controller 2. The line controller 4 controls a voltage between the lines that perform FAX, for example. The ringing detection circuit (a detector) 6 includes a photo coupler and detects a voltage change between the lines of the public line 7.

The line controller 4 is turned off by the controller 2 during energy-saving. The ringing detection circuit 6 detects the voltage change of the lines while the line controller 4 is turned off and outputs a signal (a ringing detection signal) indicating whether the voltage change has been detected to the controller 2. When the controller board 1 and the public line 7 become disconnected, a voltage of DC 48 V superimposed by the switchboard is not applied to the lines, resulting in line disconnection.

As described above, the electric charge of DC 48 V is charged to the capacitor in the ringing detection circuit 6. When the line controller 4 is turned off and is in a state of not being connected to the public line 7, the electric charge has no path to escape, whereby the state in which the electric charge is charged to the capacitor continues, and the charged state continues until the electric charge is naturally discharged.

The escape of the electric charge in the extent of natural discharge gives an extremely small current flowing through the photo coupler. Consequently, the photo coupler cannot be turned on (the ringing detection signal output by the ringing detection circuit 6 cannot be set to Low) due to the characteristics of the photo coupler. For this reason, the controller board 1 illustrated in FIG. 1 cannot detect line disconnection.

Embodiment

Figure 2:
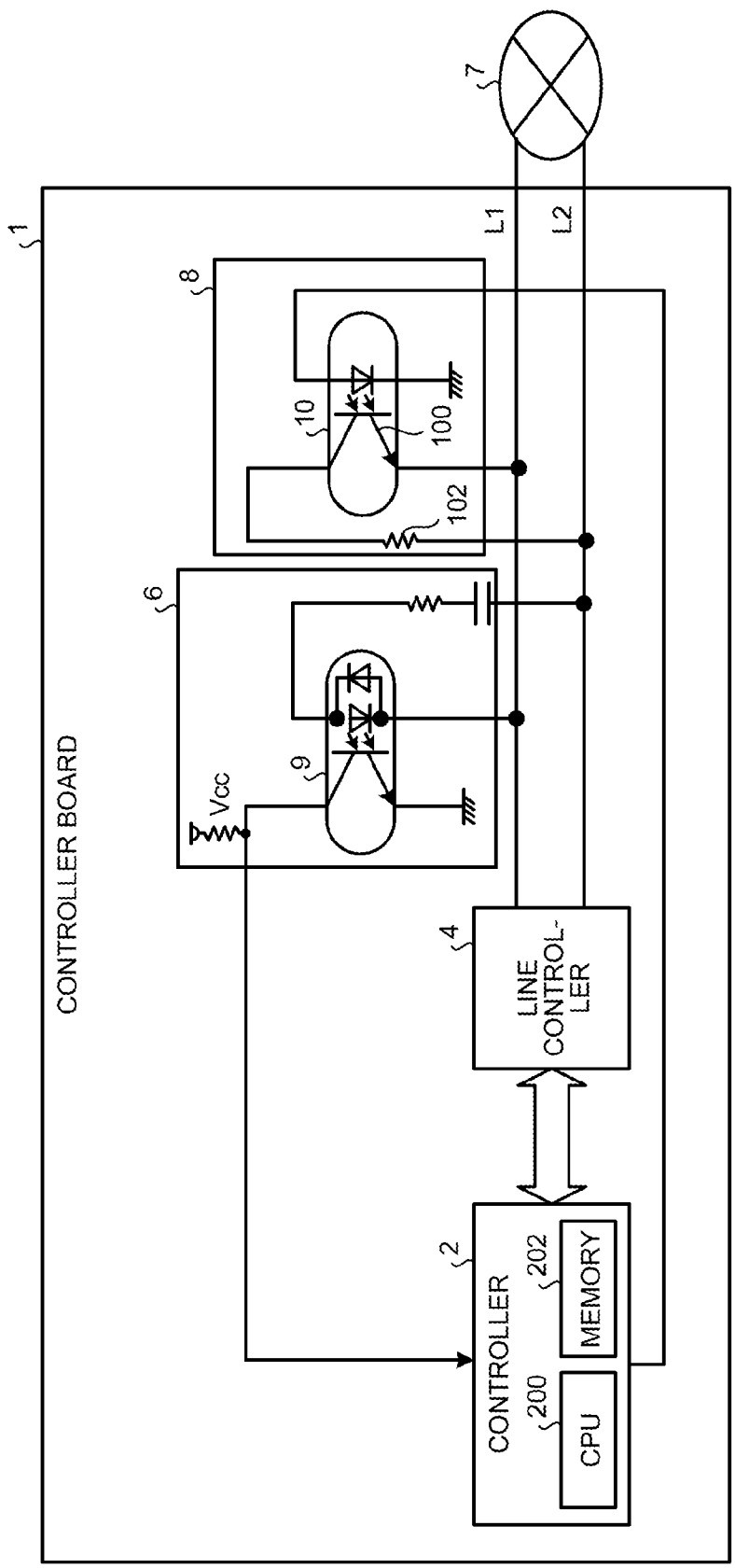
FIG. 2 is a diagram exemplifying an outline of a configuration of a controller board according to an embodiment.

Next, the following describes a configuration of a controller board (a communication apparatus) 1 according to an embodiment. FIG. 2 is a diagram exemplifying an outline of the configuration of the controller board 1 according to the embodiment. Among the components of the controller board 1 illustrated in FIG. 2, those substantially the same as the components illustrated in the controller board 1 (FIG. 1) are indicated with the same symbols. Specifically, the controller board 1 according to the embodiment further includes a line disconnection control circuit (a second controlling unit) 8.

The line disconnection control circuit 8 includes a photo coupler 10 including a transistor 100, and a resistor 102, and is connected to the public line 7. In the line disconnection control circuit 8, a light-receiving part of the photo coupler 10 is connected to between the lines, and the resistor 102 is provided in between the lines so as to be connected in series with the photo coupler 10. A light-emitting part of the line disconnection control circuit 8 is controlled by the controller 2 that is turned on even during energy-saving. The line disconnection control circuit 8 discharges the electric charge accumulated in between the lines so that the ringing detection circuit 6 can detect the voltage change between the lines when the controller 2 turns off the line controller 4. The controller 2 determines whether the controller board 1 is connected to the public line 7 based on the voltage change between the lines detected by the ringing detection circuit 6 even when the line controller 4 is turned off.

In view of laws and regulations, when a current of 20 mA or more flows between the lines, the switchboard detects that off-hook occurs and a dial tone signal is output. When a call is received from another telephone, it is handled in a line busy state. The voltage between the lines is generally 48 V. For this reason, the resistance value of the resistor 102 is set to be larger than 48 V/20 mA=2.4 kΩ, for example.

Specifically, the line disconnection control circuit 8 is controlled by a line disconnection control signal output by the controller 2. In the line disconnection control circuit 8, when the line disconnection control signal is High, the photo coupler 10 is turned on, and the resistor 102 is connected so as to be interposed between the lines, for example. Consequently, when line disconnection occurs, a current flows between the lines via the line disconnection control circuit 8, and the electric charge charged to the capacitor in the ringing detection circuit 6 escapes.

When the controller board 1 and the public line 7 are connected to each other, a voltage is applied at all times by the station power supply, whereas when line disconnection occurs, and the controller board 1 and the public line 7 become disconnected, a current flows between the lines. Consequently, a current flows also through the ringing detection circuit 6, and a voltage drop is detected by the ringing detection circuit 6. The ringing detection circuit 6 reports the voltage drop to the controller 2. In other words, line disconnection is detected. The public line 7 communicates high-frequency signals during communication. The line disconnection control circuit 8 may be a cause of noise when being turned on. For this reason, the line disconnection control circuit 8 is controlled by the controller 2 so as to function only when the controller 2 turns off the line controller 4.

Figure 3:
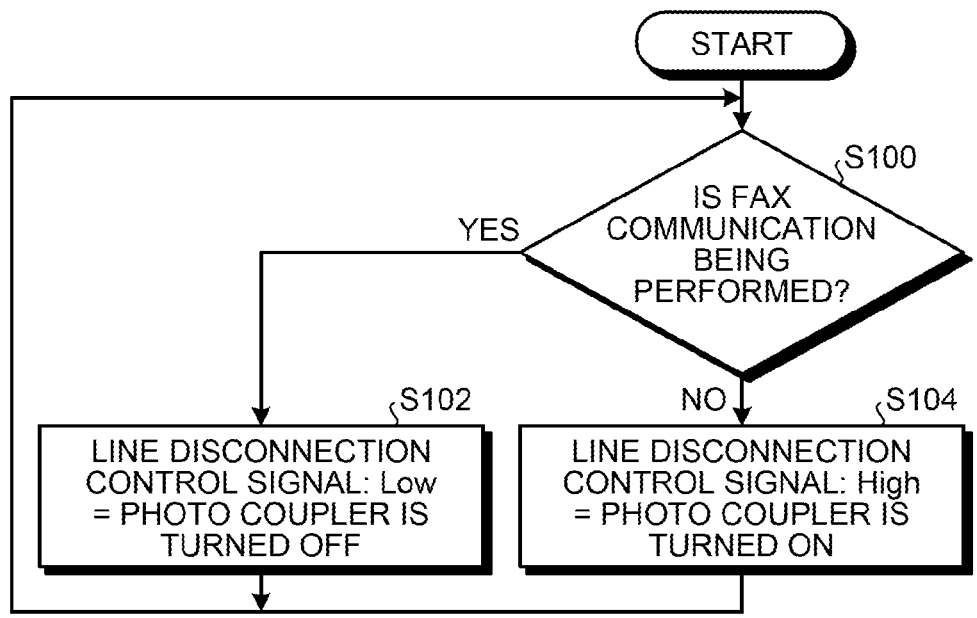
FIG. 3 is a flowchart of a first operation example of the controller board according to the embodiment.

FIG. 3 is a flowchart of a first operation example of the controller board 1 (FIG. 2) according to the embodiment. The controller 2 changes the state of the line disconnection control circuit 8 depending on whether the controller board 1 is in FAX communication. In other words, the controller 2 first determines whether the controller board 1 is in FAX communication (S100). If the controller board 1 is in FAX communication (Yes at S100), the controller 2 performs the processing at S102. If the controller board 1 is not in FAX communication (No at S100), the controller 2 performs the processing at S104.

In the processing at Step S102, communication is performed with high-frequency signals in FAX communication, and the controller 2 turns off the photo coupler 10 of the line disconnection control circuit 8. In other words, the controller board 1 turns off the photo coupler 10 of the line disconnection control circuit 8 in order to remove any circuit that causes a noise component even slightly in FAX communication and because the line cannot be disconnected from the fact that communication is available.

In contrast, in the processing at Step S104, the controller 2 turns on the photo coupler 10 of the line disconnection control circuit 8. The controller board 1 does not particularly receive a high-frequency signal from the public line 7 except for FAX communication, and the state in which the photo coupler 10 is turned on presents no problem.

Figure 4:
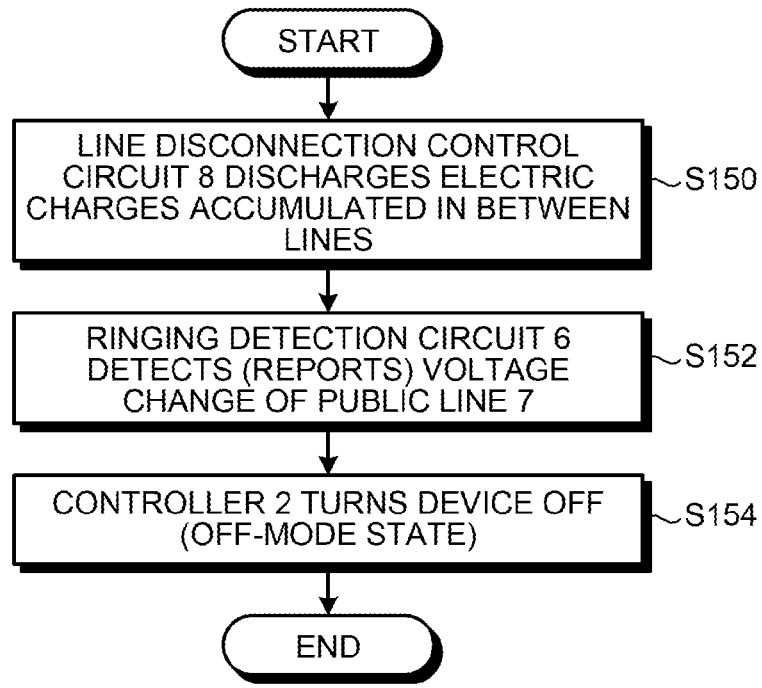
FIG. 4 is a flowchart of a second operation example of the controller board according to the embodiment.

FIG. 4 is a flowchart of a second operation example of the controller board 1 (FIG. 2) according to the embodiment. The second operation example of the controller board 1 indicates the operation of the controller board 1 when line disconnection occurs between the controller board 1 and the public line 7 after the photo coupler 10 of the line disconnection control circuit 8 has been turned on by the processing at S104 (FIG. 3).

When line disconnection occurs between the controller board 1 and the public line 7 after the photo coupler 10 of the line disconnection control circuit 8 has been turned on, the line disconnection control circuit 8 transmits a current between the lines via the resistor 102 because the photo coupler 10 is turned on, thereby discharging the electric charge accumulated in between the lines (S150).

After the line disconnection control circuit 8 discharges the electric charge in between the lines, the ringing detection circuit 6 can detect the voltage change and detects the voltage change of the public line 7 (S152). In other words, the ringing detection circuit 6 outputs the ringing detection signal to the controller 2, thereby reporting the voltage change of the public line 7 thereto.

When the voltage change of the public line 7 is reported from the ringing detection circuit 6, the controller 2 determines that line disconnection has occurred between the controller board 1 and the public line 7 and turns a device (a communication functionality part including the line controller 4, for example) off (an off-mode state) (S154)

Figure 5:
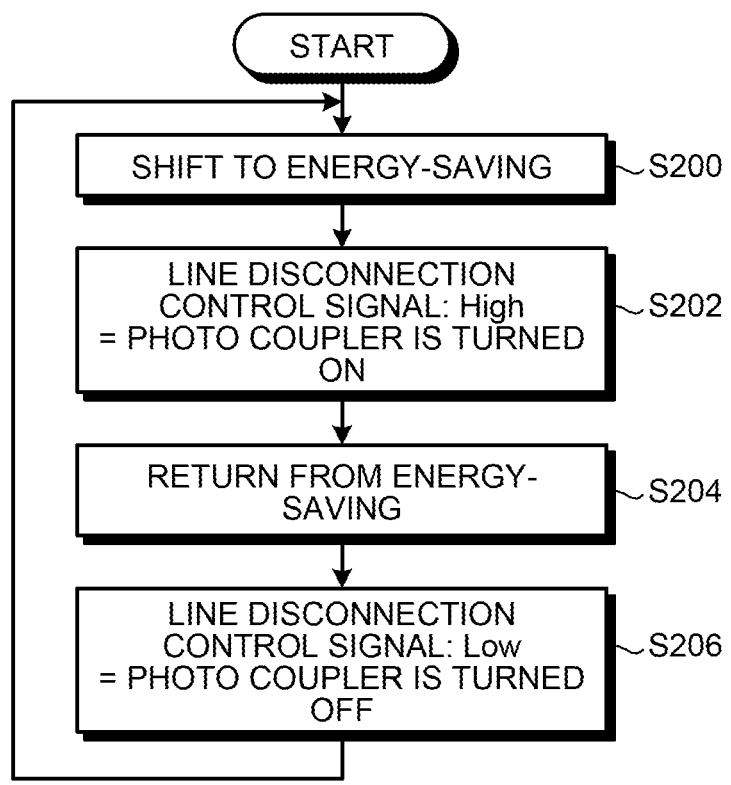
FIG. 5 is a flowchart of a third operation example of the controller board according to the embodiment.

FIG. 5 is a flowchart of a third operation example of the controller board 1 (FIG. 2) according to the embodiment. In the controller board 1, the line controller 4 is normally turned on and can cause the electric charge to escape by performing line closing in the line controller 4 even when line disconnection occurs. Consequently, voltage fluctuations can be detected by the ringing detection circuit 6. In contrast, when the line controller 4 is turned off, the photo coupler 10 of the line disconnection control circuit 8 is turned on, and line disconnection control is enabled, a current flows between the lines. In this case, electric power supplied from the switchboard of the exchange is consumed, which is not environmentally friendly if continued.

In view of the above circumstances, as illustrated in FIG. 5, the controller board 1 shifts to energy-saving (S200) and makes the line disconnection control signal High to turn on the photo coupler 10 when the line controller 4 is turned off (S202). When the controller board 1 returns from energy-saving (S204), the line controller 4 is turned on and thus the controller board 1 makes the line disconnection control signal Low to turn off the photo coupler 10 (S206).

Figure 6:
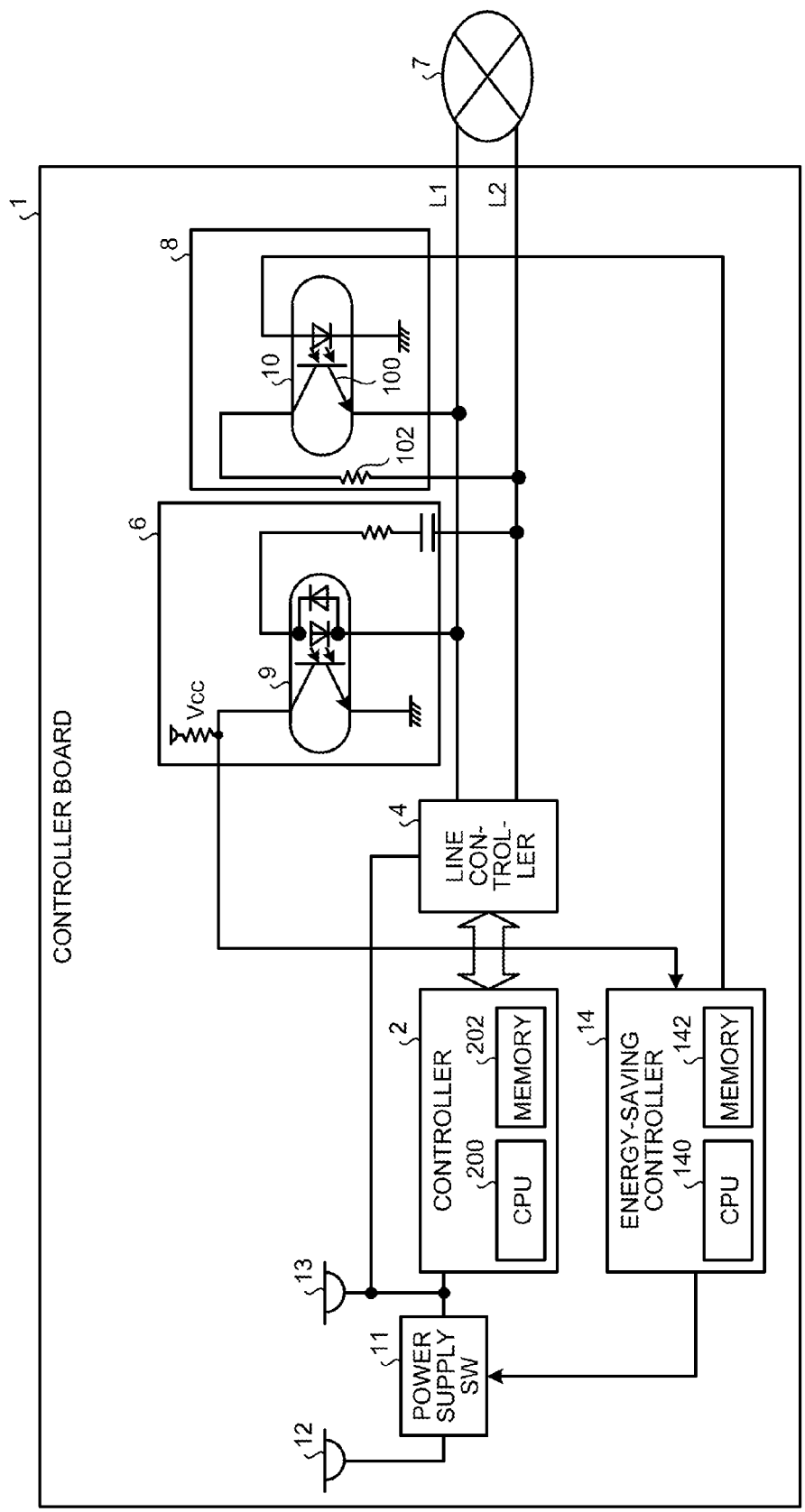
FIG. 6 is a diagram of a configuration of a modification of the controller board according to the embodiment.

Next, the following describes a modification of the controller board 1 according to the embodiment. FIG. 6 is a diagram of a configuration of the modification of the controller board 1 according to the embodiment. Among the components of the controller board 1 illustrated in FIG. 6, those substantially the same as the components illustrated in the controller board 1 (FIG. 2) are indicated with the same symbols. In the modification of the controller board 1, a power supply to supply electric power to the controller board 1 is switched between a power supply 12 and a power supply 13 by a power supply switch (SW) 11. The power supply 12 is a power supply (an on power supply) that normally turns on the controller board 1. The power supply 13 is a power supply (an off power supply) when the controller board 1 is turned off. An energy-saving controller (a third controlling unit) 14 includes a CPU 140 and a memory 142 and performs control on the line disconnection control circuit 8, the line controller 4, and the power supply switch 11 when the line controller 4 is turned off.

The controller 2 is a device for implementing all the control required for FAX communication in the controller board 1, for example. However, during energy-saving or returning from energy-saving, not all control functions of the controller 2 are required, and required functions are ones for controlling the power supply SW 11 and turning on the power supply 13 at the time of detection of returning from energy-saving and after returning from energy-saving. Given these circumstances, the energy-saving controller 14 controls the power supply SW 11 to perform control to turn on the power supply 13 at the time of detection of returning from energy-saving and after returning from energy-saving. The energy-saving controller 14 has fewer functions and consumes less power than the controller 2 does.

The line disconnection control signal is in the High state at all times during energy-saving. However, turning off the line voltage only requires turning on the photo coupler 10 for about 10 seconds, for example (the electric charge in between the lines can be caused to escape). There is no specified time from an occurrence of line disconnection to actual turning-off of the controller board 1, and it is considered that there is no problem if the controller board 1 is turned off about five minutes later, for example. Consequently, in order to make the power supply of the station power supply more energy-saving, the line disconnection control signal may be a PWM control signal providing High for 10 seconds and Low for 5 minute, for example. In other words, the ringing detection circuit 6 detects the voltage change between the lines at certain intervals when the line controller 4 is turned off.

An embodiment provides an effect that line disconnection can be detected when a line is in a non-communication state.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus, comprising:
processing circuitry that controls processing to perform facsimile communication;
line controller processing circuitry that controls a voltage between lines for the facsimile communication in accordance with control by the processing circuitry;
a detector that detects a ringing signal on the lines using a voltage change between the lines, and outputs a ring detection signal to the processing circuitry when the ringing signal on the lines is detected; and
line disconnection processing circuitry that discharges electric charge accumulated in between the lines so as to enable the detector to detect a voltage change between the lines when the line controller processing circuitry is turned off,
wherein the processing circuitry determines whether a connection to the lines is to be made based on the ringing detection signal output by the detector.

2. The communication apparatus according to claim 1, wherein the detector detects a voltage change between the lines only when the line controller processing circuitry is turned off.

3. The communication apparatus according to claim 1, wherein the detector comprises a resistor that allows a current of a value less than a current value that causes off-hook, to flow between the lines.

4. The communication apparatus according to claim 1, further comprising energy savings processing circuitry that performs control on the line disconnection processing circuitry when the line controller processing circuitry is turned off.

5. The communication apparatus according to claim 1, wherein the line disconnection processing circuitry discharges electric charge accumulated in between the lines at certain intervals when the line controller processing circuitry is turned off.

6. The communication apparatus according to claim 1, wherein:
the detector detects the ringing signal on the lines by detecting a voltage between the lines at predetermined intervals, when the line controller processing circuitry is turned off.

7. A method for determining connection, comprising:
discharging electric charge accumulated in between lines which communicate facsimile information so as to enable a detector to detect a voltage change between the lines, when line controller processing circuitry that controls a voltage between the lines is turned off;
detecting a voltage change between the lines when the line controller processing circuitry is turned off, and outputting a ringing detection signal; and
determining whether connection to the lines is to be made based on the ringing detection signal.

8. The method according to claim 7, wherein:
the detecting of the ringing signal on the lines includes detecting a voltage between the lines at predetermined intervals, when the line controller processing circuitry is turned off.

9. The method according to claim 7, wherein:
the detecting of the ringing signal on the lines includes detecting a voltage between the lines at predetermined intervals, after electric charge accumulated between lines which communicate facsimile information has been discharged.

10. A method for determining connection, comprising:
discharging electric charge accumulated between lines which communicate facsimile information, when there is no communication over the lines;
detecting a voltage change between the lines when the electric charge accumulated between the lines is discharged, and outputting a ringing detection signal; and
determining whether connection to the lines is to be made based on the ringing detection signal.

* * * * *